UNITED STATES PATENT OFFICE.

FRANK E. COOMBS, OF SAN FRANCISCO, CALIFORNIA, ASSIGNOR TO J. F. JUDGE, OF SAN FRANCISCO, CALIFORNIA.

FOOD PREPARATION AND PROCESS OF MAKING SAME.

1,363,193. Specification of Letters Patent. Patented Dec. 21, 1920.

No Drawing. Application filed October 10, 1919. Serial No. 329,667.

*To all whom it may concern:*

Be it known that I, FRANK E. COOMBS, a citizen of the United States, residing at San Francisco, in the county of San Francisco and State of California, have invented certain new and useful Improvements in Food Preparations and Processes of Making Same, of which the following is a specification.

This invention relates to food preparations and processes of making same; and it comprises as a new preparation cooked dried grain or the like containing the products of the action of diastase on starch to an extent at least sufficient to prevent superficial stickiness of the particles and being a loose-grained dry mass adapted upon moistening to reconstitute the original cooked material; and it further comprises a new method of preparing such a material wherein a suitable grain, such as rice, is cooked with water or steam and is then treated with malt extract or other material containing diastase, the treatment being to an extent at least sufficient to convert the cooked starch of the surface into other bodies, the treated material being thereafter dried; all as more fully hereinafter set forth and claimed.

There is a demand for desiccated cooked starchy foods of such a nature that the cooked food can be reconstituted by the mere addition of water. It is difficult however to produce such an article of satisfactory commercial character by reason of the properties of cooked starch. Taking rice for example, on boiling or steaming rice with proper care a thoroughly cooked wet-material may be made in which the several grains are loose and separate from each other. On attempting to dry such cooked rice however the granules adhere to each other, to the wires, etc., of the drying apparatus, and the result is a more or less unsightly conglomerate mass of no commercial value. The same is true of cooked macaroni and spaghetti, cooked hominy and many other starchy materials; but the fact is particularly noteworthy with rice. It is one of the objects of the present invention to produce satisfactory desiccated cooked starchy foods; and more particularly desiccated cooked rice.

I have found that if the cooked wet rice while still in a moist condition be treated with a malt extract, or the diastase produced from malt extract the treatment being to an extent sufficient to convert the superficially occurring starch into sugary bodies, the rice can then be dried down without the grains adhering together, producing a dried loose-grained granular material from which satisfactory cooked rice can be reconstituted by the addition of water. In order to produce this result an almost infinitesimal amount of malt extract or diastase solution is sufficient, since its action is quick and the amount of starch which can be converted by a little diastase is very great.

The action of malt extract or diastase upon grains containing cooked starch is to convert the superficial starch into sugary materials: maltose and malto-dextrins. These materials do not stick together in the way in which starchy surfaces stick together.

In a practical embodiment of the present process I boil or steam rice in order to produce the ordinary character of cooked rice. It is a useful expedient in employing water for cooking to use the same liquid repeatedly thereby securing a concentrated extract which may be utilized in various ways. In cooking with water or this extract the cooked rice loses somewhat; there being a solution of various constituents. This is of course usual in cooking rice. If the rice be steamed this loss does not occur; a product being made which has substantially the same composition, except for the changes incident to cooking, as the original rice. If steaming be so effected as to cause a condensation in the rice with the condensate flowing away, steamed rice then has about the same composition as boiled rice.

However the cooked rice is made, in the next step in my process I apply a little malt extract or diastase solution to the cooked rice. The rice may for example be immersed in a diastase solution for such a length of time as may be desired; the strength of the solution and time of exposure being sufficient to cause the action to go as far inwardly in the granules as may be desired. Or the diastase solution may be sprayed on the rice by suitable mechanical means. After spraying or dipping the rice and after the action has gone as far as may be desired, the treated material is next heated to "kill" the diastase; that is it is heated to arrest the amylolytic power of the diastase enzym. Thereafter the material is dried in any of the usual manners; as on trays in a drying bath; by heated air; etc., etc. The rice grains being freed of their superficial starch do not stick together. No substantial difference in taste is made by the action of the diastase or malt extract in such a superficial action.

Other cooked cereal grains, such as hominy, may be treated in the same way. The process may also be applied to cooked macaroni and spaghetti; cooked potato cubes; etc.

If the action of the diatase or malt solution is not quickly arrested, it extends inwardly from the surfaces of the grain and if given sufficient time the starch of the whole grain may be converted into sugary materials. When this is done, the taste and other properties of the rice are of course altered; after drying and treating with water ordinary cooked rice can no longer be reconstituted. Rice and the like however when treated in this manner to secure a thorough or far going conversion of the starch form a desirable food article of a pleasant and peculiar taste. Like the material in which the conversion is merely superficial, this material dries readily on the application of ordinary methods.

Either of the materials just described, that is the granular starchy material with a superficial conversion merely sufficient to prevent stickiness, or the material in which the conversion has gone further or has been completed, after the drying may be toasted, roasted browned, puffed, etc. Toasting or baking of course give final products from which ordinary cooked rice or the like cannot be reconstituted by water; but they are desirable food articles.

In a specific embodiment of the present process as applied to rice, the rice is cooked at atmospheric or higher pressure by means of water or steam until cooking has gone as far as is desirable. The hot cooked rice is cooled to a temperature not to exceed 70° C. and advantageously somewhere between 60 and 70°; and is then immersed in malt solution of the same temperature. This solution may be made by treating 100 pounds of dried malt with 100 gallons of water at about 60° C. for from 3 to 6 hours. On straining off the liquid extract from the undissolved matter (hulls, etc.,) an ordinary malt extract adapted for the present process is secured. This may be used with the rice in the proportion of one volume of malt extract to one volume of cooked rice. Or any of the commercial diastase preparations in a 2 to 5 per cent. solution may be substituted. Presuming that only a superficial conversion is wanted the malt solution is simply sprayed on the cooked rice or the rice is dipped and removed and the material after 3 to 10 minutes time to allow action, is heated to a temperature of about 80 or 90° C. for 2 minutes to kill the diastase. Thereafter the material is dried in the usual way to make a material which can be packaged and stored. If a more extensive conversion of the starch is wanted, the amount of malt solution may be kept the same and the period of exposure thereto made 30 or more minutes. Otherwise the operation is the same. After the drying, either of the materials made as just described, may be baked, toasted, browned, puffed, etc., in the usual ways. A completely converted rice when dried and baked at a sufficient temperature gives an excellent coffee substitute.

What I claim is:—

1. As a new material, a cooked desiccated starchy food of dry loose-grained character, the several granules being superficially free of starch.

2. As a new material, a cooked desiccated rice in the form of dried cooked loose rice grains having their surfaces substantially free of starch, said rice being adapted to reconstitute ordinary cooked rice on addition of water.

3. The process of producing desiccated cooked starchy foods of granular nature to reconstitute the original cooked food on addition of water, which comprises cooking such a food to form a loose-grained mass, treating the grain surfaces with a diastase solution, raising the temperature to kill the diastase and drying.

4. The process of producing a loose-grained desiccated cooked starchy food, which comprises cooking such a food, treating the grain surfaces with a diastase solution, raising the temperature to kill the diastase, drying and browning.

5. The process of producing desiccated loose-grained cooked rice adapted to reconstitute the original cooked rice on addition of water, which comprises cooking rice to produce a loose mass of cooked grains, treating the grain surfaces with a diastase solution, raising the temperature to kill the diastase and drying.

In testimony whereof I affix my signature hereto.

FRANK E. COOMBS.